(12) United States Patent
Chu et al.

(10) Patent No.: US 7,668,829 B2
(45) Date of Patent: Feb. 23, 2010

(54) METHOD AND APPARATUS FOR STORING MUSIC FILE IN MOBILE COMMUNICATION TERMINAL

(75) Inventors: Se Youp Chu, Gumi-si (KR); Chang Tak Kang, Gumi-si (KR); Yun Seong Lee, Daegu Metropolitan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 431 days.

(21) Appl. No.: 11/806,574

(22) Filed: Jun. 1, 2007

(65) Prior Publication Data

US 2008/0066610 A1    Mar. 20, 2008

(30) Foreign Application Priority Data

Sep. 18, 2006    (KR) .................. 10-2006-0090062

(51) Int. Cl.
*G06F 7/00* (2006.01)
*G06F 17/00* (2006.01)
(52) U.S. Cl. ................... 707/7; 707/1; 707/104.1; 455/412.1
(58) Field of Classification Search ............. 707/1, 707/7, 3, 104.1; 455/412.1
See application file for complete search history.

(56) References Cited

U.S. PATENT DOCUMENTS

| 2006/0121886 | A1* | 6/2006 | Maehara et al. | 455/412.1 |
| 2006/0265421 | A1* | 11/2006 | Ranasinghe et al. | 707/104.1 |
| 2007/0021145 | A1* | 1/2007 | Lam | 455/556.1 |
| 2007/0038672 | A1* | 2/2007 | Plastina et al. | 707/104.1 |
| 2007/0294294 | A1* | 12/2007 | Aarnio et al. | 707/104.1 |
| 2008/0005688 | A1* | 1/2008 | Najdenovski | 715/765 |
| 2009/0070339 | A1* | 3/2009 | Cho et al. | 707/10 |

FOREIGN PATENT DOCUMENTS

KR    10-2006-0033840 A    4/2006

* cited by examiner

*Primary Examiner*—Don Wong
*Assistant Examiner*—Angela M Lie
(74) *Attorney, Agent, or Firm*—Roylance, Abrams, Berdo & Goodman, LLP

(57) ABSTRACT

A method for storing a music file in a mobile communication terminal using a number key of the mobile terminal includes: designating a specific music file from at least one music file displayed in a music file playback mode; inputting a number of a music file list in which the designated music file is to be stored, using a corresponding number key; and storing the designated music file in the music file list having the input number. The method simplifies the storage of a music file in a mobile terminal and also facilitates changing the location of a music file stored in a music file list.

14 Claims, 4 Drawing Sheets

METHOD AND APPARATUS FOR STORING MUSIC FILE IN MOBILE COMMUNICATION TERMINAL

PRIORITY

This application claims the benefit under 35 U.S.C. § 119(a) of Korean Patent Application No. 2006-90062, filed in the Korean Intellectual Property Office on Sep. 18, 2006, the entire disclosure of which is hereby incorporated by reference.

BACKGROUND OF THE INVENTION

1. Field of the Invention

The present invention relates generally to a method and apparatus for storing a music file in a mobile communication terminal in a simplified manner. More particularly, the present invention relates to a method and apparatus for storing a music file in a mobile communication terminal through a number key input.

2. Description of the Related Art

Mobile communication terminals have developed from simple tools used to make and receive telephone calls into multimedia devices offering a wide variety of supplementary services including electronic note functions, gaming, and schedule management functions. Users of mobile communication terminals also use wireless Internet services to find information on the Internet and to send and receive e-mails, thereby significantly increasing the usefulness of the mobile terminals.

A mobile communication terminal with an MP3 player for playing back MP3 audio files has recently been developed to meet increasing demands for multimedia services. A mobile communication terminal capable of playing back MP3 audio files enables a user to listen to music or other audio files without a conventional dedicated music file player or portable cassette player. The mobile communication terminal can play back a desired MP3 audio file and output the MP3 audio file through a built-in speaker or through earphones.

In general, a user of a mobile communication terminal having an MP3 playback function has to step through multiple menus to set up a music file list. For example, the process of setting up a music file list may include selecting a music file stored in a mobile communication terminal, selecting an appropriate menu or option to display music file lists stored in the mobile communication terminal, selecting a desired music file list from the displayed music file lists, and storing the music file in the music file list. Setting up a music file list in this manner causes complication and inconvenience to users.

A mobile communication terminal also generally requires a number of steps to change the location of a desired music file in a music file list. The method for changing the location of a desired music file typically involves selecting an MP3 playback function, selecting a folder in which a desired music file list is stored, sequentially selecting the desired music file list and the desired music file, selecting an appropriate menu or option to display music file lists stored in the mobile communication terminal as described above, selecting a desired destination music file list from the displayed music file lists, and moving the music file to the selected destination music file list for storage. As in the case of setting up a music file list, changing the location of a desired music file into another music file list in this manner causes complication and inconvenience to users.

SUMMARY OF THE INVENTION

In order to solve the above problems, embodiments of the present invention can provide a method for storing a music file in a mobile communication terminal in a simplified manner that allows simple and easy storage of the music file in a music file list.

Embodiments of the present invention can also provide a method for storing a music file in a mobile communication terminal in a simplified manner that allows the location of the music file stored in a music file list to be easily changed.

In an exemplary embodiment of the present invention, a method for storing a music file list in a simplified manner in a mobile communication terminal includes designating a specific music file from at least one music file displayed in a music file playback mode; inputting the number of a music file list in which the designated music file is to be stored, using a corresponding number key; and storing the designated music file in the music file list having the inputted number.

In another exemplary embodiment of the present invention, a method for storing a music file in a simplified manner in a mobile communication terminal includes checking whether a function for storing a music file in a simplified manner is selected; designating, if the function for storing a music file is selected, a specific music file from at least one music file displayed in a music file playback mode and inputting a number using a corresponding number key; checking whether a music file list with the inputted number exists; storing, if a music file list with the inputted number exists, the designated music file in the music file list with the inputted number; and creating, if a music file list with the inputted number does not exist, the music file list with the number, and storing the designated music file in the created music file list.

An apparatus for storing a music file in a simplified manner in a mobile communication terminal is also within the scope of the present invention. Embodiments of such an apparatus may be provided with means for carrying out the methods described above.

BRIEF DESCRIPTION OF THE DRAWINGS

The above and other objects, features and advantages of embodiments of the present invention will be more apparent from the following detailed description when read in conjunction with the accompanying drawings, in which.

DETAILED DESCRIPTION OF PREFERRED EMBODIMENTS

Hereinafter, exemplary embodiments of the present invention are described in detail with reference to the accompanying drawings. Detailed descriptions of constructions or processes known in the art have been omitted to avoid obscuring the subject matter of the present invention.

In the embodiments described, a music file is an MP3 audio file; however, the invention is not limited to the use of the MP3 audio file format. The term "music file" is used broadly to refer to an audio file containing audio signals of any type, including music, speech or other audible content. The term "music file list" means a list or folder of music files obtained by classifying music files stored in a mobile communication terminal according to user selection or otherwise. A "number key long press input" refers to an input performed by pressing a number key for longer than a preset time duration.

Figure 1:
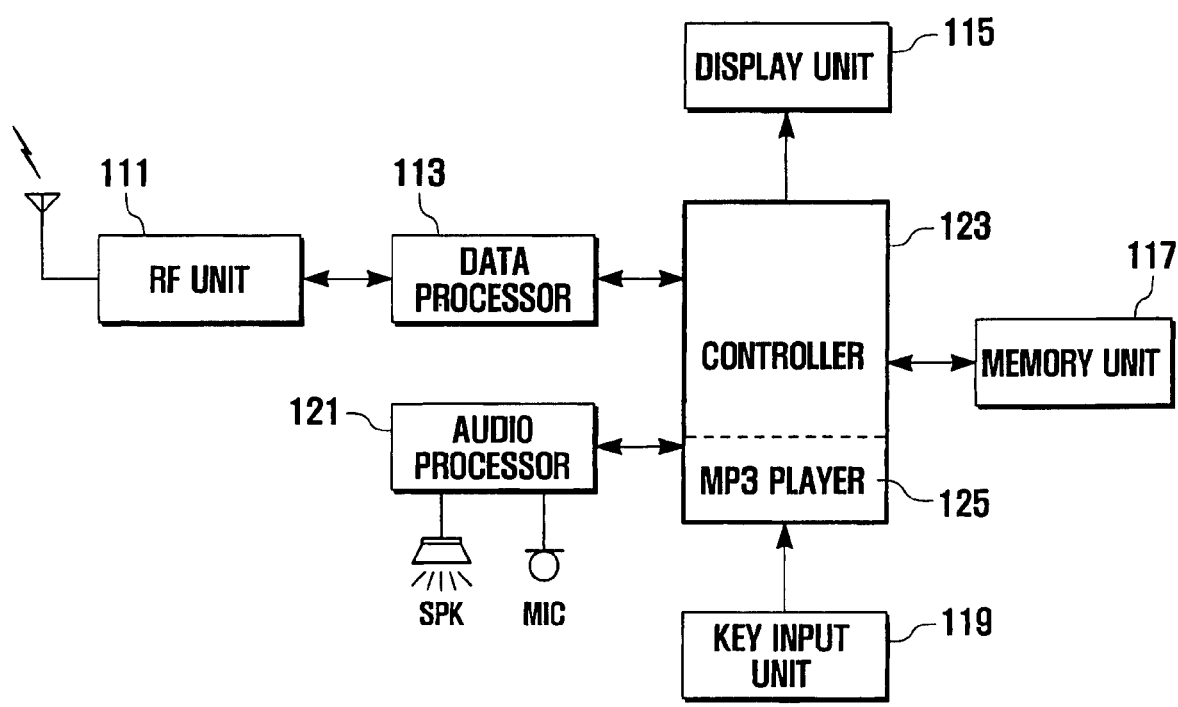
FIG. 1 is a schematic block diagram illustrating the configuration of a mobile communication terminal for storing a music file in a simplified manner according to an exemplary embodiment of the present invention.

FIG. 1 is a schematic block diagram illustrating the configuration of a mobile communication terminal for storing a music file list in a simplified manner according to an exemplary embodiment of the present invention.

Referring to FIG. 1, the mobile communication terminal has a typical configuration including a radio frequency (RF) unit 111, a data processor 113, a display unit 115, a memory unit 117, a key input unit 119, an audio processor 121, a controller 123, and an MP3 player 125 that is an audio file player.

The RF unit 111 performs the wireless communication functions of the mobile communication terminal. The RF unit 111 includes an RF transmitter that up-converts the frequency of a signal to be transmitted and amplifies the signal, and an RF receiver that low-noise amplifies a received signal and down-converts its frequency.

The data processor 113 includes a transmitter that encodes and modulates the signal to be transmitted and a receiver that demodulates and decodes the received signal. That is, the data processor 113 includes a modulator/demodulator (modem) and a coder/decoder (codec). The codec includes a data codec for processing incoming data such as packet data and an audio codec for processing audio signals such as voice signals.

The display unit 115 displays data controlled and outputted by the controller 123. For example, in the present embodiment, the display unit 115 displays a music file playback function, stored music file lists, and music files stored in each music file list.

The memory unit 117 includes a program memory for performing mobile communications, and a data memory. The program memory stores programs for controlling the general operations of the mobile communication terminal, and a program for storing music files in a music file list having a specific number that is input by long pressing a corresponding number key. The data memory temporarily stores data generated while executing programs according to the present embodiment.

The key input unit 119 receives a user's manipulation signal for controlling the operation of the mobile communication terminal. In the present embodiment, the key input unit 119 allows the user to select a function for storing a music file in a simplified manner (hereinafter referred to as the "music file storing function"), establishes a time duration for recognizing a long press of a number key, and inputs a specific number with a long press to implement the music file storing function. The key input unit 119 of the mobile terminal includes navigation (up/down/right/left) keys, a select button, soft keys, number keys, and so on.

The audio processor 121 reproduces a music file or audio signal that is outputted from the controller 123, or outputs an audio signal generated through a microphone MIC to the audio codec of the data processor 113 for transmission.

The controller 123 controls the overall operation of the mobile communication terminal. The controller 123 may include an internal or external MP3 player 125. In the present embodiment, the controller 123 includes the internal MP3 player 125. If, after a music file list stored in the MP3 player 125 is selected, a specific music file is designated from the music file list and a specific number key is input with a long press, the controller 123 controls the memory unit 117 to store the designated music file in the music file list having the specific number.

Figure 2:
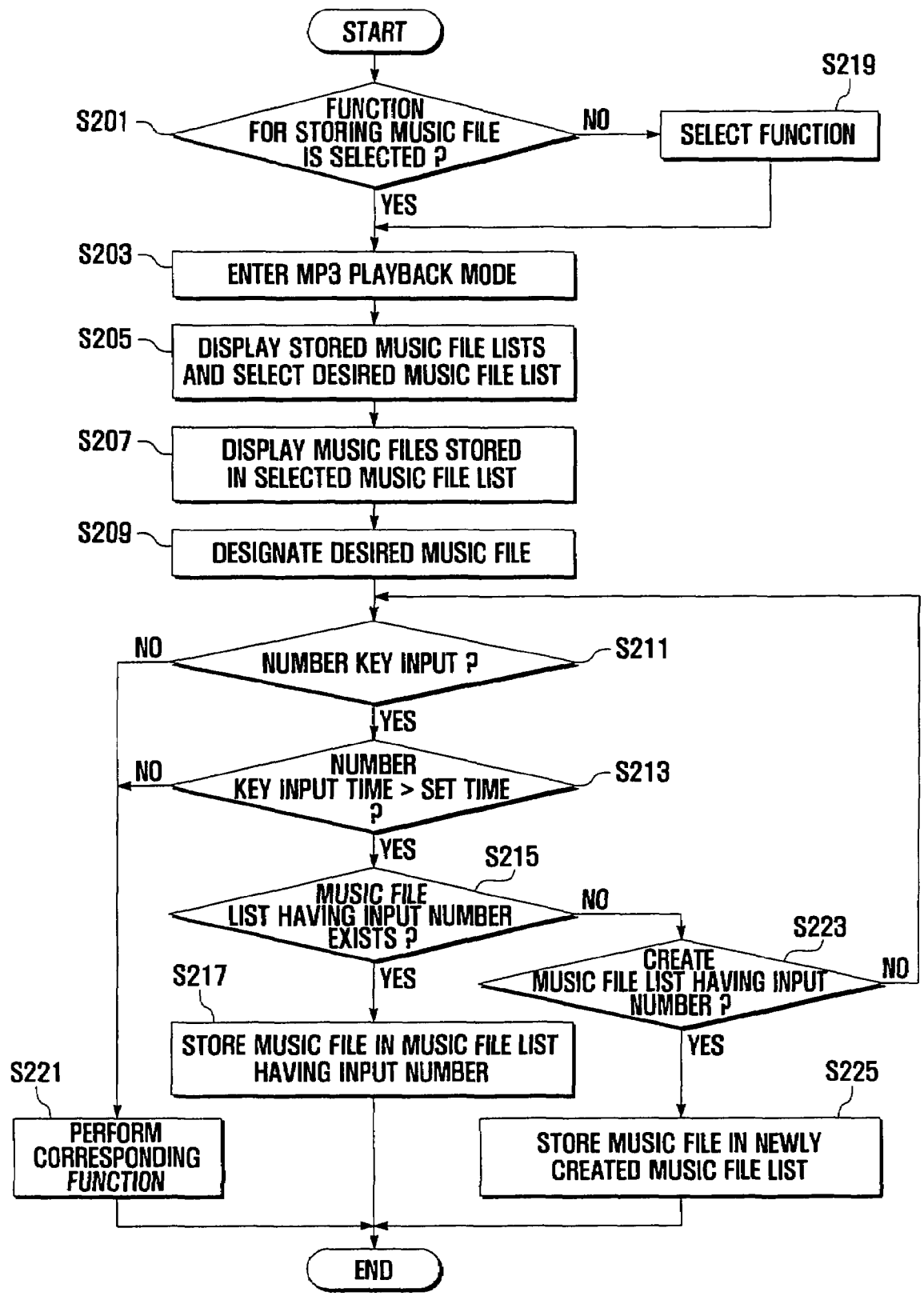
FIG. 2 is a flowchart illustrating a method for storing a music file in a simplified manner in a mobile communication terminal according to an exemplary embodiment of the present invention.
Figure 3:
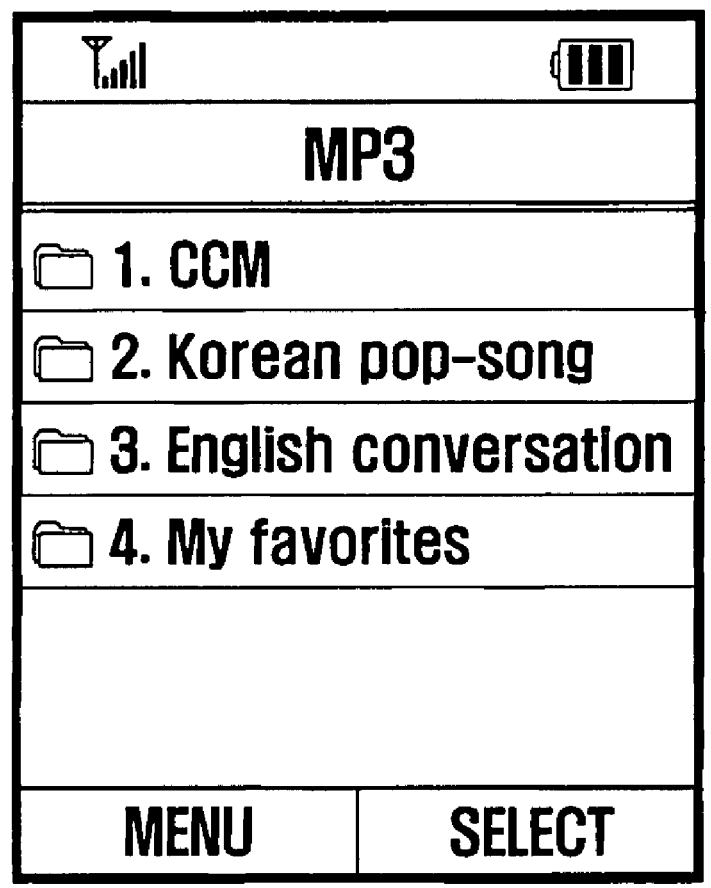
FIG. 3 illustrates the screen of a mobile communication terminal on which a music file playback mode has been selected according to the method of FIG. 2.
Figure 4A:
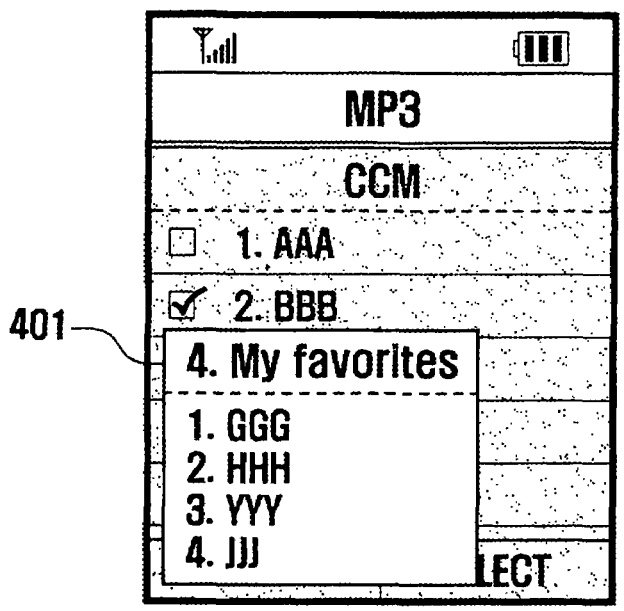
FIG. 4A illustrates the screen of a mobile communication terminal on which the number of an existing music file list has been inputted according to the method of FIG. 2.
Figure 4B:
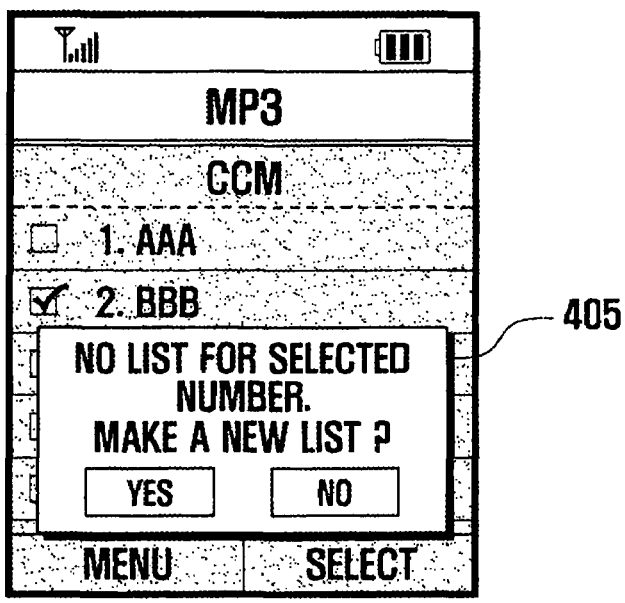
FIG. 4B illustrates the screen of a mobile communication terminal on which a number with no existing music file list has been inputted according to the method of FIG. 2.

A method for storing a music file in a simplified manner is described in detail with reference to FIGS. 2, 3 and 4A-4B. FIG. 2 is a flowchart illustrating a method for storing a music file in a simplified manner in a mobile communication terminal according to an exemplary embodiment of the present invention. FIG. 3 illustrates a screen of a mobile communication terminal on which a music file playback mode has been selected according to the method of FIG. 2. FIG. 4A illustrates the screen of a mobile communication terminal on which the number of an existing music file list has been input according to the method of FIG. 2. FIG. 4B illustrates the screen of a mobile communication terminal on which a number with no existing music file list has been input according to the method of FIG. 2.

Referring first to the flowchart of FIG. 2, the controller 123 checks to determine whether a music file storing function is selected (S201). If a music file storing function is not selected, the controller 123 controls the key input unit 119 to select the music file storing function according to user input (S219). When selecting the music file storing function, the key input unit 119 also establishes a time duration for determining whether a number key input is a long press input. The controller 123 then controls the mobile communication terminal to enter a music file playback mode (S203).

As illustrated in FIG. 3, the controller 123 next controls the display unit 115 to display music file lists stored in the memory unit 117. In the example, four music file lists are stored in the memory unit 117. If no music file list is stored in the memory unit 117, a music file list is first created and stored in the memory unit 117 before continuing the process. The controller 123 then recognizes the selection of a desired music file list by the user through the key input unit 119 (S205). The user can select the designated music file list using a select button if the desired music file list is designated using navigation keys. After a music file list is selected, the controller 123 controls the display unit 115 to display the music files stored in the selected music file list (S207). A desired music file in the selected music file list is then designated by the user through the key input unit 119 (S209). For example, the user can use the navigation keys and select button to perform this designation. As illustrated in FIG. 4A, the controller 123 recognizes that the music file #2 'BBB' is designated among the music files stored in the file list #1 'CCM'.

Next, the controller 123 checks to determine whether a specific number key is input by the user (S211). If no number key is input, the controller 123 performs a function corresponding to an input event (S221). The user can use the navigation keys and select button to select the function corresponding to the input event, which can, for example, include playing the selected music file, deleting the selected music file, and so on. However, if a number key is input, the controller 123 checks to determine whether the number key is pressed for longer than the time duration established in step S201 (S213). That is, the controller 123 checks to determine whether the number key input is a long press input. If the number key input is not a long press input, the controller performs a function corresponding to an input event (S221).

If the number key is pressed for longer than the preset time duration, the controller 123 checks to determine whether a music file list exists that corresponds to the specific number which is being input by long pressing the number key (S215). If a music file list having the specific number exists—for example, if a number key 4 is long pressed as illustrated in FIG. 4A—the name of the music file list and the music files stored in the music file list are displayed in a pop-up window 401 and the controller 123 controls the memory unit 117 to store the designated music file in the music file list having the number inputted with the long press (S217). As illustrated in FIG. 4A, the music file #2 'BBB' stored in the music file list #1 'CCM' is moved to the music file list #4 'My favorites'. In the present embodiment, the designated music file can be stored in a specific position in the music file list with the number inputted with the long press, regardless of the existing location of music files previously stored in the music file list. That is, the music file #2 stored in the music file list #1 can be stored in a specific position in the music file list #4 through the user's manipulation of the key input unit 119.

If no music file list having the number input with a long press exists at step S215, the controller 123 checks to determine whether to create a new music file list having the inputted number (S223). As illustrated in FIG. 4B, number key 5 is long pressed, but no music file list #5 exists, so the controller 123 informs the user that no music file list #5 exists and controls the display unit 115 to display a pop-up window 405 asking the user whether to create a new music file list #5.

If a new music file list is to be created, the controller 123 controls the memory unit 117 to store the designated music file in the newly created music file list (S225). That is, the music file #2 'BBB' is stored in the newly created music file list #5. If a new music file list is not to be created, the process returns to step S211.

While the present invention has been shown and described with reference to exemplary embodiments thereof, it will be understood by those of ordinary skill in the art that various changes and modifications in form and details may be made without departing from the spirit and scope of the present invention as defined by the appended claims and their equivalents.

For example, the music file storing function according to the present invention may further include a function for displaying a music file in a music file playback mode by short pressing a number key. That is, if a number key is pressed for shorter than the preset time duration, a music file having the number of the number key can be displayed.

As described above, embodiments of the present invention can enable a music file stored in a music file list to be moved to another music file list using an input of a specific number key. That is, embodiments of the present invention can allow easy and simple storage of a music file in another music file list by long pressing a specific number key. Embodiments of the present invention can also allow the user to easily change the location of a music file within the music file list.

What is claimed is:

1. A method for storing a music file list in a mobile communication terminal, comprising:
   designating a specific music file from at least one music file displayed in a music file playback mode;
   inputting a number of a music file list in which the designated music file is to be stored, using a corresponding number key of the mobile communication terminal; and
   storing the designated music file in the music file list having the inputted number.

2. The method of claim 1, wherein storing the designated music file comprises:
   checking whether the music file list having the inputted number exists;
   determining, if the music file list with the inputted number does not exist, whether to create a music file list having the inputted number;
   storing, if the music file list having the inputted number is created, the music file in the created music file list.

3. The method of claim 1, wherein inputting a number of a music file list comprises:
   displaying, after inputting a number of a music file list, music files stored in the music file list having the inputted number; and
   setting a location of the designated music file among the displayed music files.

4. A method for storing a music file in a mobile communication terminal, comprising:
   designating a specific music file from at least one music file displayed in a music file playback mode and inputting a number using a corresponding number key of the mobile communication terminal;
   checking whether a music file list having the inputted number exists;
   storing, if a music file list having the inputted number exists, the designated music file in the music file list having the inputted number; and
   creating, if a music file list having the inputted number does not exist, a music file list having the inputted number, and storing the designated music file in the created music file list.

5. The method of claim 4, wherein checking whether a function for storing a music file is selected comprises setting a time duration of pressing the number key.

6. The method of claim 5, wherein the number key is inputted for longer than the set time duration.

7. The method of claim 4, wherein storing the music file in the music file list having the inputted number comprises:
   displaying the music file list with the number and music files stored in the music file list; and
   setting a location of the designated music file within the music file list.

8. An apparatus for storing a music file list in a mobile communication terminal, comprising:
   means for designating a specific music file from at least one music file displayed in a music file playback mode;
   means for inputting a number of a music file list in which the designated music file is to be stored, using a corresponding number key of the mobile communication terminal; and
   means for storing the designated music file in the music file list having the inputted number.

9. The apparatus of claim 8, wherein said means for storing the designated music file comprises:
   means for checking whether the music file list having the inputted number exists;
   means for determining, if the music file list with the inputted number does not exist, whether to create a music file list having the inputted number;
   means for storing, if the music file list having the inputted number is created, the music file in the created music file list.

10. The apparatus of claim 8, wherein said means for inputting a number of a music file list comprises:
    means for displaying, after inputting a number of a music file list, music files stored in the music file list having the inputted number; and
    means for setting a location of the designated music file among the displayed music files.

11. An apparatus for storing a music file in a mobile communication terminal, comprising:
- means for checking whether a function for storing a music file is selected;
- means for designating, a specific music file from at least one music file displayed in a music file playback mode and inputting a number using a corresponding number key of the mobile communication terminal;
- means for checking whether a music file list having the inputted number exists;
- means for storing, if a music file list having the inputted number exists, the designated music file in the music file list having the inputted number; and
- means for creating, if a music file list having the inputted number does not exist, a music file list having the inputted number, and for storing the designated music file in the created music file list.

12. The apparatus of claim 11, wherein said means for checking whether a function for storing a music file is selected comprises means for setting a time duration of pressing the number key.

13. The apparatus of claim 12, wherein a function for storing a music file is selected when the number key is inputted for longer than the set time duration.

14. The apparatus of claim 11, wherein said means for storing the music file in the music file list having the inputted number comprises:
- means for displaying the music file list having the inputted number and the music files stored in the music file list; and
- means for setting a location of the designated music file within the music file list.

* * * * *